United States Patent
Fadell et al.

(10) Patent No.: US 7,451,250 B2
(45) Date of Patent: *Nov. 11, 2008

(54) METHODS AND APPARATUS FOR PROVIDING AUTOMATIC HIGH SPEED DATA CONNECTION IN PORTABLE DEVICE

(75) Inventors: Anthony M. Fadell, Portola Valley, CA (US); Christoph Krah, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/363,843

(22) Filed: Feb. 27, 2006

(65) Prior Publication Data

US 2006/0143356 A1    Jun. 29, 2006

Related U.S. Application Data

(63) Continuation of application No. 10/179,814, filed on Jun. 24, 2002, now Pat. No. 7,054,981.

(60) Provisional application No. 60/348,746, filed on Oct. 22, 2001.

(51) Int. Cl.
  *G06F 13/14*  (2006.01)
(52) U.S. Cl. .......................... 710/27; 710/308
(58) Field of Classification Search ................ 710/305, 710/22–28, 306, 308
  See application file for complete search history.

(56) References Cited

U.S. PATENT DOCUMENTS

| 4,975,832 A | 12/1990 | Saito et al. |
| 5,187,425 A | 2/1993 | Tanikawa |
| 5,287,053 A | 2/1994 | Hutchinson |
| 5,477,126 A | 12/1995 | Shiojima |
| 5,566,306 A * | 10/1996 | Ishida .......................... 710/309 |
| 5,583,721 A * | 12/1996 | Kim .......................... 360/97.01 |
| 5,617,009 A | 4/1997 | Takao et al. |
| 5,737,634 A * | 4/1998 | Hamano et al. ................ 710/27 |
| 5,828,856 A | 10/1998 | Bowes et al. |

(Continued)

FOREIGN PATENT DOCUMENTS

JP      59103121      6/1984

(Continued)

OTHER PUBLICATIONS

International Search Report from related PCT application PCT/US02/33567 mailed Jan. 24, 2003.

*Primary Examiner*—Glenn A. Auve
*Assistant Examiner*—Trisha Vu
(74) *Attorney, Agent, or Firm*—Beyer Law Group LLP

(57) ABSTRACT

In a portable FireWire compatible device, a direct memory access (DMA) bus switch coupled by way of a DMA bus to a central processing unit (CPU), a local hard drive (HDD), and a FireWire port, provides a direct connection between the FireWire port and the HDD bypassing a main bus and the CPU when a data transfer request is received and processed by the CPU. Otherwise, until the data transfer request is received and processed, the CPU is directly connected to the HDD. In this way, a high speed data transfer between the FireWire port and the HDD is provided only when an appropriate data transfer request is received and processed.

34 Claims, 4 Drawing Sheets

U.S. PATENT DOCUMENTS

| | | | |
|---|---|---|---|
| 5,991,839 A * | 11/1999 | Ninomiya | 710/303 |
| 6,034,508 A | 3/2000 | Chang | |
| 6,078,742 A | 6/2000 | Chow | |
| 6,249,833 B1 | 6/2001 | Takahashi | |
| 6,295,297 B1 * | 9/2001 | Lee | 370/395.61 |
| 6,377,530 B1 | 4/2002 | Burrows | |
| 6,477,482 B1 | 11/2002 | Maupin et al. | |
| 6,658,520 B1 | 12/2003 | Bennett | |
| 6,701,405 B1 | 3/2004 | Adusumilli et al. | |
| 6,718,405 B2 | 4/2004 | Rogers | |
| 6,804,263 B1 * | 10/2004 | Okawa | 370/489 |
| 6,947,922 B1 * | 9/2005 | Glance | 707/3 |
| 6,963,946 B1 * | 11/2005 | Dwork et al. | 710/310 |
| 7,054,981 B2 | 5/2006 | Fadell et al. | |
| 2002/0059487 A1 * | 5/2002 | Talati | 710/36 |

FOREIGN PATENT DOCUMENTS

| | | |
|---|---|---|
| JP | 2000155738 | 6/2000 |
| WO | WO 0167457 | 9/2001 |

* cited by examiner

METHODS AND APPARATUS FOR PROVIDING AUTOMATIC HIGH SPEED DATA CONNECTION IN PORTABLE DEVICE

CROSS REFERENCE TO RELATED APPLICATIONS

This application is a continuation of U.S. patent application Ser. No. 10/179,814, entitled "METHODS AND APPARATUS FOR PROVIDING AUTOMATIC HIGH SPEED DATA CONNECTION IN PORTABLE DEVICE," filed Jun. 24, 2002 now U.S. Pat. No. 7,054,981, which is incorporated herein by reference, and which, in turn, claims the benefit of priority under 35 U.S.C. § 119(e) to U.S. Provisional Patent Application No. 60/348,746, entitled "METHODS AND APPARATUS FOR PROVIDING AUTOMATIC HIGH SPEED DATA CONNECTION IN A FIREWIRE ENABLED PORTABLE MULTIMEDIA DEVICE," filed on Oct. 22, 2001, which is incorporated herein by reference.

BACKGROUND OF THE INVENTION

1. Field of Invention

This invention relates generally to computing systems. Specifically, a method and apparatus for providing a direct connection between a FireWire connected external memory source and a local hard drive in order to facilitate a high speed data transfer in a portable FireWire enabled device is described.

2. Description of Related Art

FireWire is a IEEE 1394 compliant High Performance Serial Bus that provides two types of data transfer: asynchronous and isochronous. Asynchronous is for traditional load-and-store applications where data transfer can be initiated and an application interrupted as a given length of data arrives in a buffer. Isochronous data transfer ensures that data flows at a pre-set rate so that an application can handle it in a timed way while providing the bandwidth needed for audio, imaging, video, and other streaming data. Isochronous service means it guarantees latency or the length of time between a requested action and when the resulting action occurs which is a critical feature in supporting real time video, for example. FireWire provides a high-speed serial bus with data transfer rates of 100, 200, or 400 Mbps as well as a single plug-and-socket connection on which up to 63 devices can be attached with data transfer speeds up to 400 Mbps (megabits per second). In this way, FireWire offers a standard, simple connection to all types of consumer electronics, including digital audio devices, digital VCRs and digital video cameras; as well as to traditional computer peripherals such as optical drives and hard disk drives.

The standard Firewire cable consists of six wires in which data is sent via two separately-shielded twisted pair transmission lines that are crossed in each cable assembly to create a transmit-receive connection. Two more wires carry power (8 to 28 v, 1.5 A max.) to remote devices. In some cases, such as with DV camcorders manufactured by the Sony Corporation of Japan, a four conductor FireWire cable is used (configured as the 6 wire cable but without the power wires) that terminate in smaller, 4 prong connectors. To connect a four prong device, such as the Sony DV camcorder with a standard IEEE 1394 Firewire device or interface card, an adapter cable is required having 4 prongs on one side and 6 on the other. In this way, the data lines are connected while omitting the power connection.

Currently, portable FireWire enabled multimedia devices (such as MP3 players, and the like) are limited by the ability to transfer large data files directly from a FireWire connected external memory storage medium and a local hard drive (HDD) since the FireWire must communicate with the HDD by way of a main bus. In such situations, the high speed data transfer capabilities inherent in a FireWire cable can not be reached.

Therefore, what is required is a method and apparatus for providing a direct connection between a FireWire connected external memory source and a local hard drive in order to facilitate a high speed data transfer in a portable FireWire enabled device.

SUMMARY OF THE INVENTION

According to the present invention, methods, apparatus, and systems are disclosed for providing a cascadable state machine for broadcast content is disclosed.

In one embodiment, an apparatus for providing a direct connection between an external memory source and a local hard drive in order to facilitate a high speed data transfer in a system that includes a central processing unit (CPU) connected to a main system bus is disclosed. The apparatus includes a direct memory access (DMA) bus, a local hard drive (HDD) coupled to the DMA bus, a port receptor connected to the DMA bus arranged to receive an external connector, and a direct memory access bus switch coupled by way of the DMA bus to the CPU. In the described embodiment, the switch that provides a direct connection between the port receptor and the HDD by way of the DMA bus only thereby bypassing the main system bus and the CPU when an appropriate data transfer request is received and processed by the CPU. In this way the high speed data transfer between the port receptor and the HDD is provided only when the appropriate data transfer request is received and processed by the CPU.

In another embodiment, a method for providing a direct connection between an external memory source and a local hard drive in order to facilitate a high speed data transfer in a system that includes a central processing unit (CPU) connected to a main system bus is described. A direct memory access (DMA) bus is provided after which a local hard drive (HDD) is connected to the DMA bus. A port receptor arranged to receive an external connector is connected to the DMA bus. A direct memory access bus switch bus is coupled to the CPU by way of the DMA such that only when an appropriate data transfer request is received and processed by the CPU, a direct connection is provided between the port receptor and the HDD by way of the DMA bus only thereby bypassing the main system bus and the CPU such that the high speed data transfer is provided between the port receptor and the HDD.

In yet another embodiment, an apparatus for providing a direct connection between an external memory source and a local hard drive in order to facilitate a high speed data transfer in a system that includes a central processing unit (CPU) connected to a main system bus is described. The apparatus includes means for providing a direct memory access (DMA) bus, means for coupling a local hard drive (HDD) to the DMA bus, means for connecting a port receptor to the DMA bus arranged to receive an external connector, means for coupling a direct memory access bus switch bus to the CPU by way of the DMA. Only when an appropriate data transfer request is received and processed by the CPU, means for providing a direct connection between the port receptor and the HDD by way of the DMA bus only thereby bypassing the main system bus and the CPU, and means for providing the high speed data transfer between the port receptor and the HDD.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In a portable FireWire compatible device, a direct memory access (DMA) bus switch coupled by way of a DMA bus to a central processing unit (CPU), a local hard drive (HDD), and a FireWire port, provides a direct connection between the FireWire port and the HDD bypassing a main bus and the CPU when a data transfer request is received and processed by the CPU. Otherwise, until the data transfer request is received and processed, the CPU is directly connected to the HDD. In this way, a high speed data transfer between the FireWire port and the HDD is provided only when an appropriate data transfer request is received and processed.

The invention will now be described in terms a DMA switch suitable for providing a high speed data transfer path between a FireWire port and a local HDD in any FireWire compatible device. Such devices include, for example, personal digital assistants, personal MP3 player/recorders, and the like.

Figure 1:
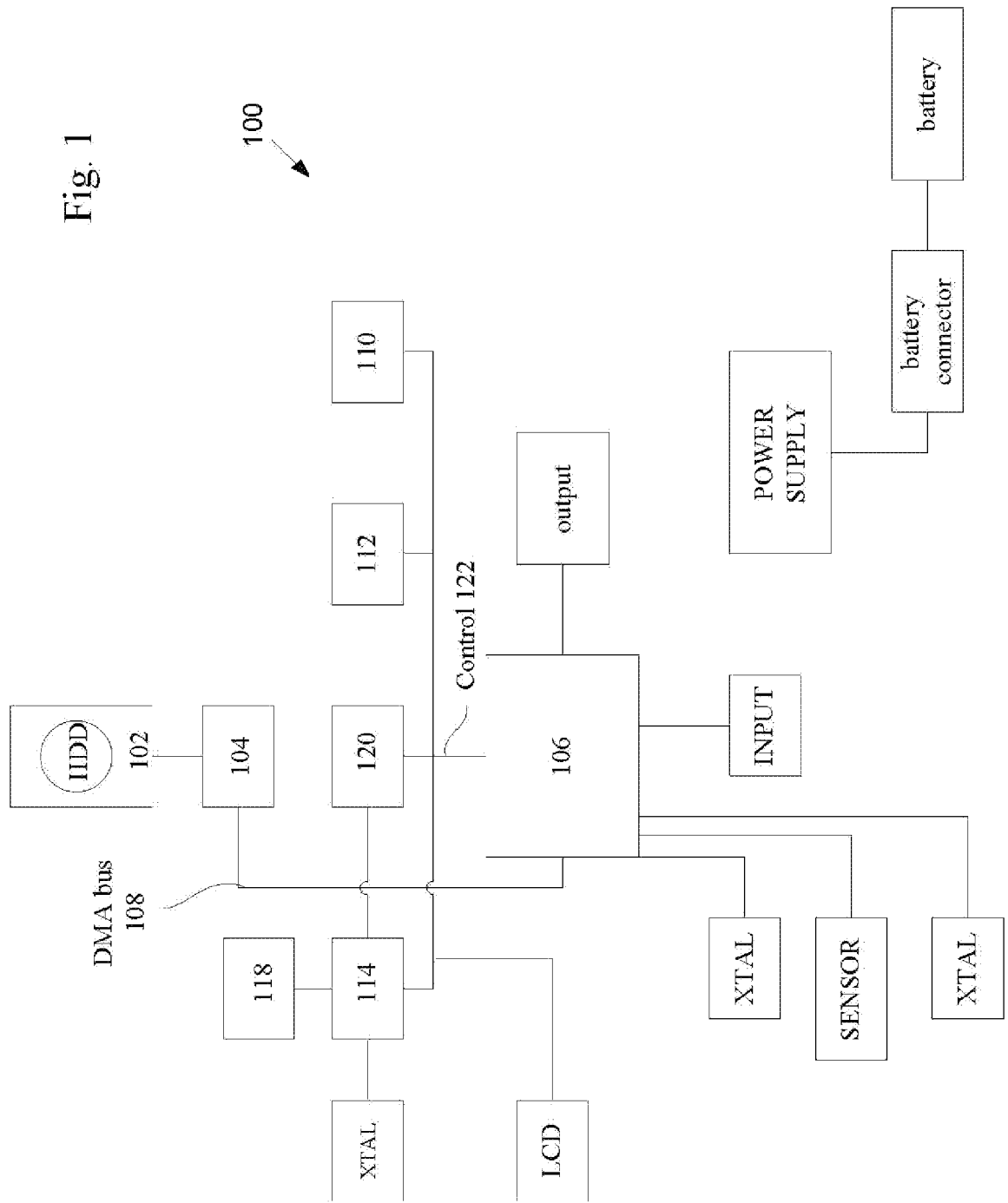
FIG. 1 shows an exemplary portable FireWire enabled multimedia device in accordance with an embodiment of the invention.

Accordingly, FIG. 1 shows an exemplary portable FireWire enabled multimedia device 100 in accordance with an embodiment of the invention. The device 100 includes a local hard drive (HDD) 102 coupled by way of an HDD connector 104 to a central processing unit (CPU) 106 by way of a DMA bus 108. The CPU 106 is, in turn connected to any number of devices, such as SDRAM 110, Flash ROM 112, and a FireWire physical link 114 by way of a main bus 116. In the described embodiment, the physical link 114 provides an interface between a FireWire standard connector 118 (also referred to as a FireWire port) and the DMA bus 108 which connects a DMA bus switch unit 120 to the physical link 114.

Figure 2:
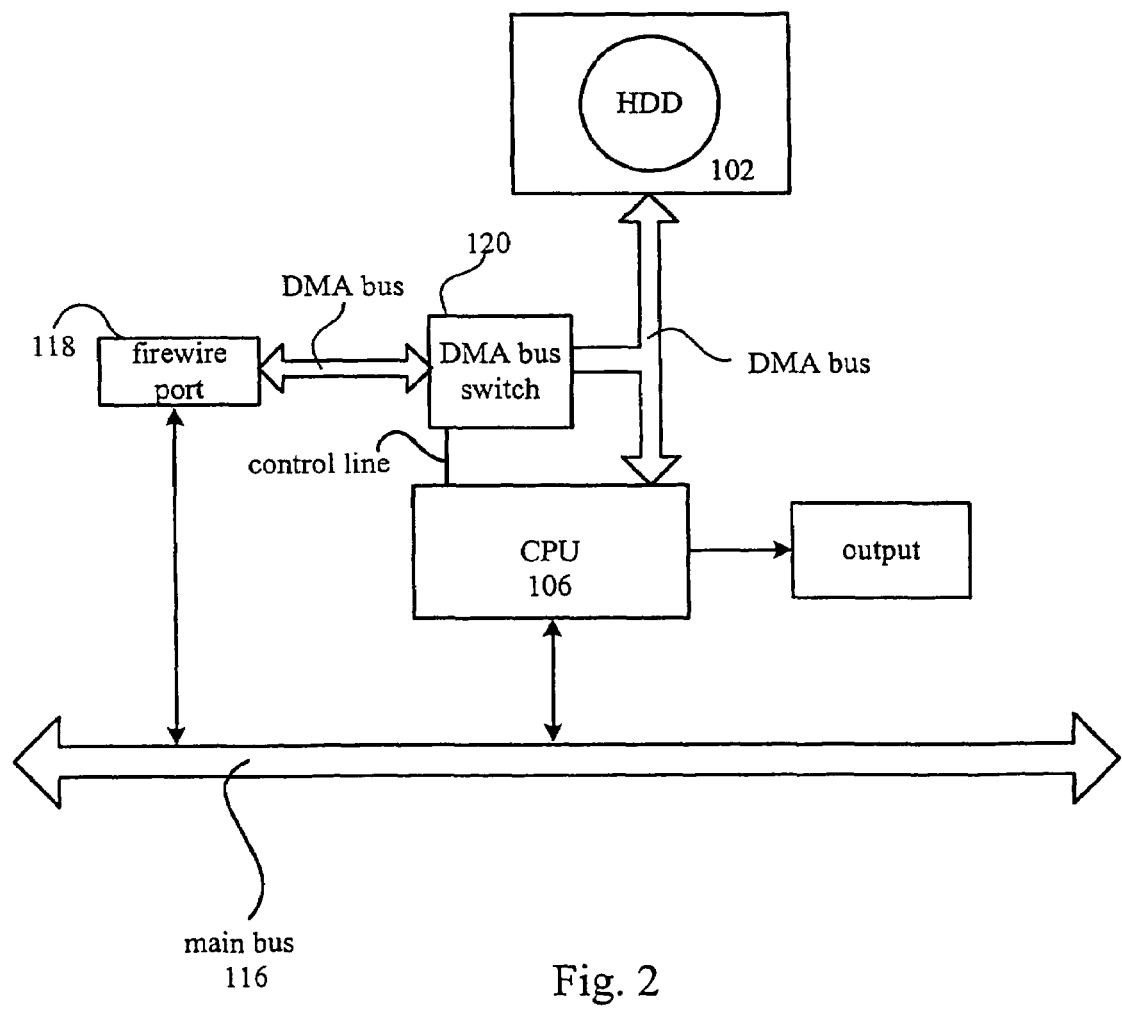
FIG. 2 shows a simplified schematic of a portion of the FireWire enabled multimedia device shown in FIG. 1.

FIG. 2 shows a simplified schematic of a portion of the FireWire enabled multimedia device 100 shown in FIG. 1 useful in illustrating the situation when a data transfer request is received the CPU 106. The CPU 106 processes the request by determining if a FireWire cable (not shown) is connected to the standard connector 118 and if so, sends a switch signal by way of a control line 122 to the DMA bus switch 120. The DMA bus switch 120 responds to the switch signal by providing a direct data transfer path between the port 118 and the HDD 102 so as to avoid transferring data by way of the main bus 116. In this way a high speed data transfer between an external memory source connected by way of a FireWire cable to the port 118 and the HDD 102. In those cases where the FireWire cable in not connected, then the device is in what is referred to as portable mode and the DMA bus switch 120 is inactive thereby preserving power resources.

Figure 3:
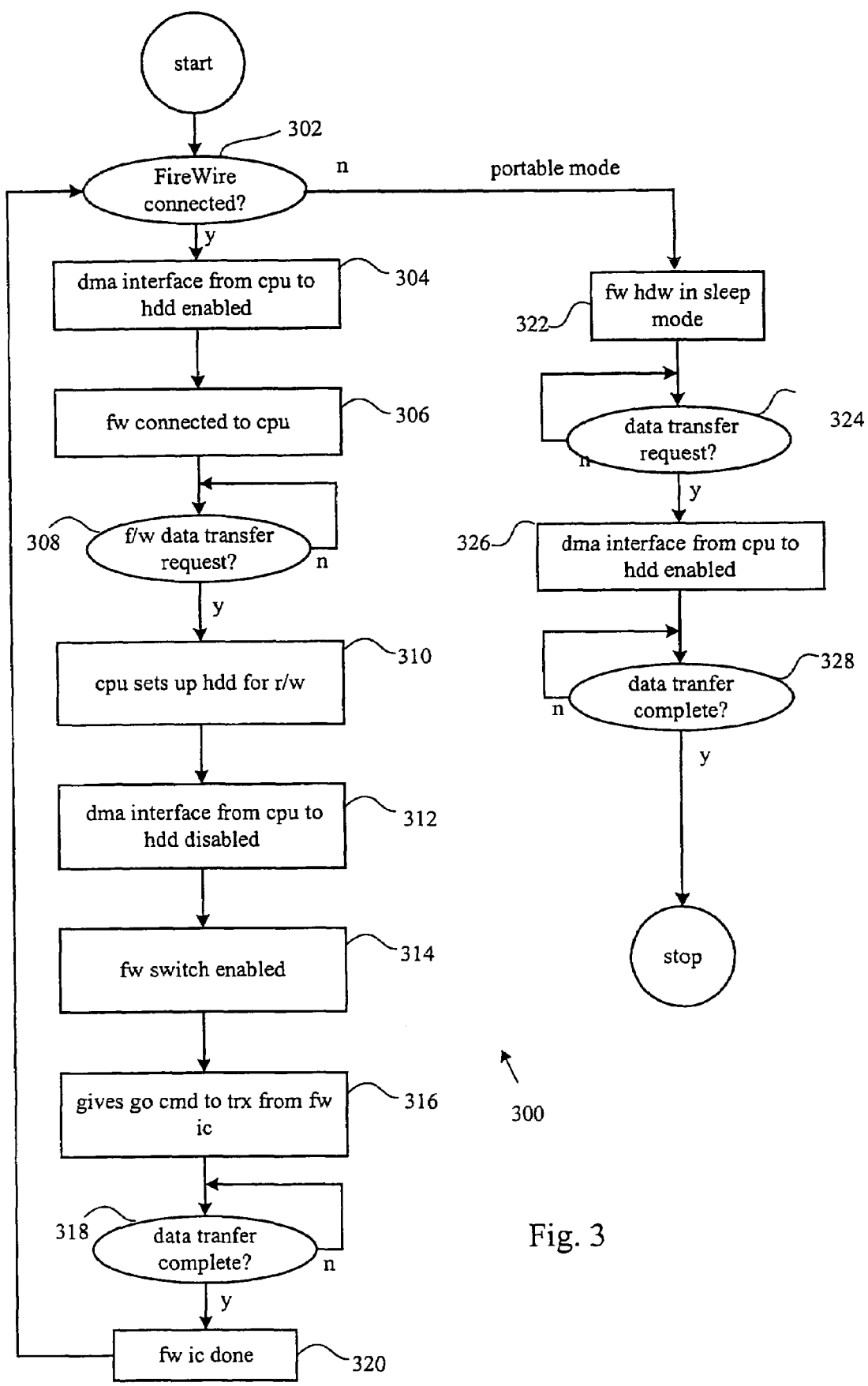
FIG. 3 shows a flowchart detailing a process for providing a high speed data transfer path between a FireWire port and a local HDD in accordance with an embodiment of the invention.

FIG. 3 shows a flowchart detailing a process 300 for providing a high speed data transfer path between a FireWire port and a local HDD in accordance with an embodiment of the invention. Accordingly, the process 300 begins at 302 by determining whether or not a FireWire cable is connected to the device, if so, then a DMA interface between the CPU and the HDD is enabled at 304. At 306, the FireWire cable is connected to the CPU queries at 308 whether or not a data transfer request has been received. When a data request has been received, the CPU sets up the HDD for a data transfer (i.e., a read/write operation) at 310 and the DMA interface between the CPU and the HDD is disabled at 312 substantially simultaneously with, at 314, the FireWire DMA switch being enabled. A control circuit then provides a data transfer initiate signal at 316 for the data transfer to begin while at 318 a query is made by the control circuit whether or not the data transfer has completed. When the data transfer has completed at 320, control is passed back to 302.

Returning to 302, if it has been determined that the FireWire cable is not connected, then the device is in portable mode and the FireWire circuits are in sleep mode at 322. At 324, if a data transfer request has been received, then the DMA interface between the CPU and the HDD is enabled at 326 and a data transfer takes place until it is determined at 328 to be complete at which time the process 300 stops normally.

Figure 4:
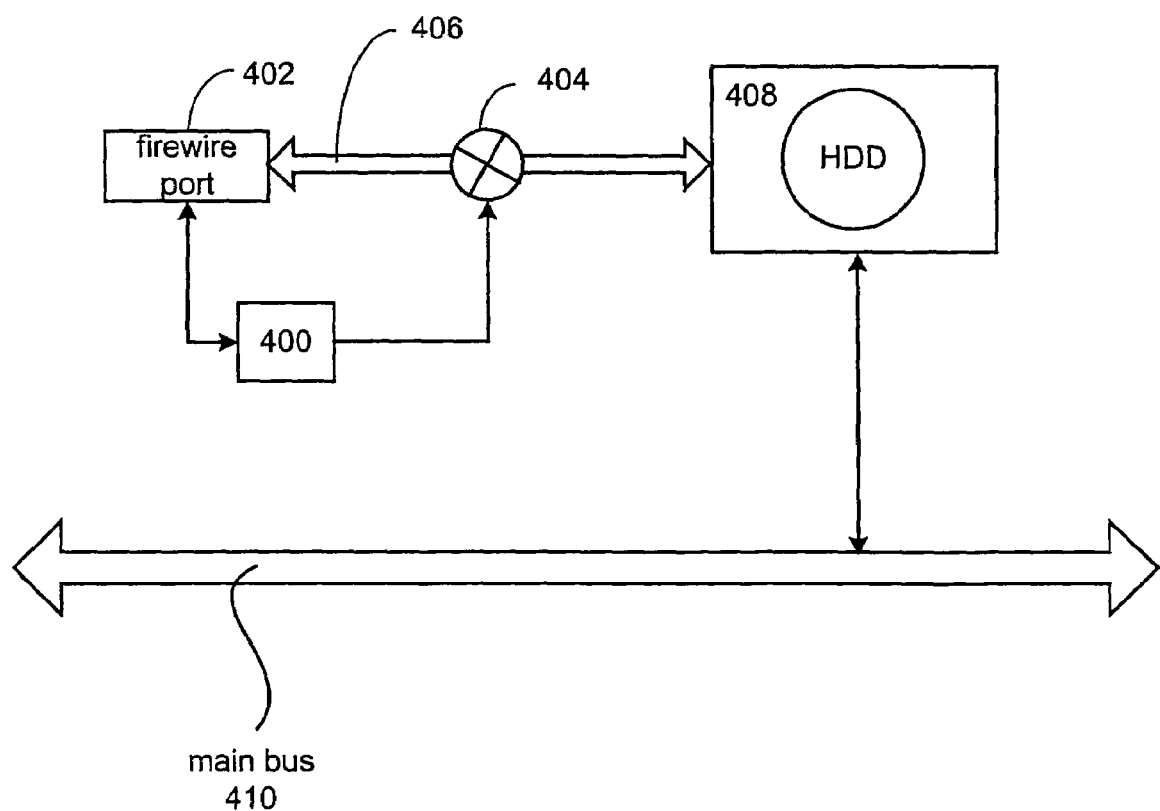
FIG. 4 shows another embodiment of the invention.

In another embodiment of the invention shown in FIG. 4, a FireWire detection circuit 400 detects whether or not a FireWire cable is connected to the FireWire port 402. In those cases when a FireWire cable is connected to the port 402, a data transfer circuit 404 coupled to a DMA bus 406 directly connects an HDD 408 to the FireWire cable bypassing a main bus 410 so as to provide a high speed data path between an external device coupled to the FireWire cable and the HDD 408.

The invention may also be embodied as a computer program product, meaning a tangible product containing a series of instructions executable by a machine.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

The invention claimed is:

1. A method for providing a high speed data transfer between an external data source and an internal data storage device in a system that includes a central processing unit (CPU) always connected to a main system bus, wherein the CPU has a first direct connection to the internal data storage, wherein the first direct connection is not a part of, or connected to, the main system bus, the method comprising:

disabling the first direct connection during the data transfer;

providing a second direct connection between the external data source and the internal data storage device; and transferring the data by way of the second direct connection without intervention by the CPU.

2. A method as recited in claim 1, wherein the internal data storage device is connected to a direct memory access (DMA) bus having a port receptor arranged to receive an external connector coupled to the external data source and wherein the DMA bus is connected to the CPU only by way of a DMA bus switch and is not directly connected to the main system bus.

3. A method as recited in claim 2, further comprising:
receiving an appropriate data transfer request by the CPU; and
signaling the DMA bus switch to prevent the CPU from accessing the internal data storage device.

4. A method as recited in claim 3, wherein the CPU continues to process executable instructions during the high speed data transfer.

5. A method as recited in claim 3, wherein the system is a portable multimedia player that includes an MP3 player.

6. Computer program product executable by a processor for providing a high speed data transfer between an external data source and an internal data storage device in a system that includes a central processing unit (CPU) always connected to a main system bus, wherein the CPU has a first direct connection to the internal data storage, wherein the first direct connection is not a part of, or connected to, the main system bus, comprising:
computer code for disabling the first direct connection during the data transfer;
computer code for providing a second direct connection between the external data source and the internal data storage device;
computer code for transferring the data by way of the second direct connection without intervention by the CPU; and
computer readable medium for storing the computer code.

7. Computer program product as recited in claim 6, wherein the internal data storage device is connected to a direct memory access (DMA) bus having a port receptor arranged to receive an external connector and wherein the DMA bus is connected to the CPU by way of a DMA bus switch and is not directly connected to the main system bus.

8. Computer program product as recited in claim 7, further comprising:
computer code for receiving an appropriate data transfer request by the CPU; and
computer code for signaling the DMA bus switch to prevent the CPU from accessing the internal data storage device.

9. Computer program product as recited in claim 8, wherein the CPU continues to process executable instructions during the high speed data transfer.

10. Computer program product as recited in claim 8, wherein the system is incorporated into a portable consumer electronic device.

11. An apparatus for providing a high speed data transfer between an external data source and a internal data storage device in a system that includes a central processing unit (CPU) always connected to a main system bus, wherein the CPU has a first direct connection to the internal data storage, wherein the first direct connection is not a part of, or connected to, the main system bus, comprising:
a switch that disables the first direct connection during the data transfer; and
a direct memory access (DMA) bus connected to the CPU by way of the switch wherein the DMA bus is used for transferring the data without intervention by the CPU and is not directly connected to, or a part of, the main system bus wherein when an appropriate data transfer request is received by the CPU, the CPU signals the switch to prevent the CPU from accessing the internal data storage device and wherein the CPU continues to execute instructions during the data transfer.

12. An apparatus as recited in claim 11, wherein until the switch provides the direct connection between local memory and the external data source and the local memory by way of the DMA bus, the CPU is directly connected to the internal data storage device.

13. An apparatus as recited in claim 11, further comprising:
a port receptor arranged to couple the DMA bus and an external connector.

14. An apparatus as recited in claim 13, wherein the external connector is an IEEE 1394 compliant type connector.

15. An apparatus as recited in claim 11, wherein the apparatus is incorporated in a portable consumer electronic product.

16. A method of transferring data directly between an external memory device and a internal data storage device coupled to a memory bus in a portable electronic consumer product that also includes a central processing unit (CPU) that is always connected to a main system bus and a port receptor connected to the memory bus arranged to receive an external connector, comprising:
providing a direct connection between the port receptor and the internal data storage device by way of the memory bus without intervention by the CPU during which the CPU is unable to access the internal data storage device and executes instructions during the data transfer, wherein the direct connection is not a part of or directly connected to the main system bus; and
disabling an interface between the CPU and the direct connection to prevent the intervention by the CPU with the internal storage device during the data transfer.

17. A method as recited in claim 16, further comprising:
directly connecting the CPU to the internal data storage device until an appropriate data transfer request is received and processed by the CPU.

18. A method as recited in claim 16, wherein the portable electronic consumer product is a portable multimedia player.

19. A method as recited in claim 18, wherein the portable multimedia player is an MP3 player.

20. Computer program product executable by a central processing unit (CPU) for transferring data directly between an external memory device and a internal data storage device coupled to a memory bus in a portable electronic consumer product that includes a receptor connected to the memory bus arranged to receive ant external connector, wherein the CPU is always connected to a main system bus, and wherein the CPU has a first direct connection to the internal data storage device, comprising:
computer code for disabling the first direct connection during the data transfer;
computer code for providing a second direct connection between the port receptor and the internal data storage device by way of the memory bus without intervention by the CPU during which the CPU executes instructions during the data transfer and is unable to access the internal data storage device; and
computer readable medium for storing the computer code.

21. Computer program product as recited in claim 20, further comprising:
directly connecting the CPU to the internal data storage device until the appropriate data transfer request is received and processed by the CPU.

22. Computer program product as recited in claim 20, wherein the portable electronic consumer product is a portable multimedia player.

23. Computer program product as recited in claim 22, wherein the portable multimedia player is an MP3 player.

24. A portable electronic consumer product, comprising:
a central processing unit (CPU);
a main system bus always connected to the CPU;
an internal data storage device;
a memory bus connected to the internal data storage device;
a port receptor connected to the memory bus; and
a switch coupled by way of the memory bus to the CPU that provides a direct connection between the port receptor and the internal data storage device by way of the memory bus, the switch further configured to disable the coupling between the memory and the CPU during the data transfer so that the data transfer can occur without further intervention by the CPU and the CPU is unable to access the internal data storage device during the data transfer, wherein the direct connection is not a part of or directly connected to the main system bus.

25. A portable electronic consumer product as recited in claim 24, wherein data is transferred directly between the port receptor and the internal data storage device by way of the memory bus only when an appropriate data transfer request is received and processed by the CPU.

26. A portable electronic consumer product as recited in claim 24, wherein the portable electronic consumer product is a portable multimedia player.

27. A portable electronic consumer product as recited in claim 24, further comprising:
a connector detection unit that signals the CPU that the port receptor is connected to a connector.

28. A portable electronic consumer product as recited in claim 27, wherein when the connector detection unit signals the CPU that the port receptor is not connected to the connector, then the CPU directs the portable electronic consumer product to operate in a portable mode.

29. A portable electronic consumer product as recited in claim 28, wherein when the portable electronic consumer product is in the portable mode, the switch is inactive thereby preserving power resources.

30. A method for improving the data transfer speed between an internal data storage device in a system that includes a central processing unit (CPU) and an external memory source, comprising:
connecting the external data source and the internal data storage device so that a direct connection between the central processing unit and the internal data storage device is bypassed, wherein the direct connection is not a part of, or connected to, a main system bus;
receiving a data transfer request at the central processing unit;
processing the data transfer request at the central processing unit;
transferring data between the external data source and the internal data storage device without further use of the central processing unit in response to the data transfer request;
preventing the central processing unit from accessing the internal data storage device during the data transfer by disabling an interface between the central processing unit and the internal storage device; and
processing, during the data transfer, one or more other instructions at the central processing unit that are unrelated to the data transfer.

31. A method as recited in claim 30, wherein the internal data storage device is connected to a direct memory access (DMA) bus having a port receptor arranged to receive an external connector coupled to the external memory source and wherein the DMA bus is connected to the CPU only by way of a DMA bus switch.

32. A method as recited in claim 31, further comprising:
signaling the DMA bus switch to prevent the CPU from accessing the internal data storage device in response to the data transfer request.

33. A method as recited in claim 30, wherein the system is a portable multimedia player.

34. A portable multimedia device, comprising:
a central processing unit;
a system bus connected to the central processing unit;
a memory bus connected to the central processing unit;
an internal data storage device connected to the memory bus;
a direct connection between the central processing unit and the internal data storage device, wherein the direct connection is not a part of, or connected to, the system bus;
a port receptor connected to the memory bus;
a switch coupled via the memory bus to the central processing unit, the switch configured to selectively disable the interface between the memory bus and the central processing unit,
wherein after a data transfer request is received and processed at the central processing unit, during the data transfer, the switch:
connects the port receptor and the internal storage device via the memory bus without further use of the central processing unit and prevents the central processing unit from interfacing with the internal storage device, and thereby enabling the central processing unit to process one or more other instructions during the data transfer.

* * * * *